United States Patent [19]

Kelderman

[11] Patent Number: 5,127,216
[45] Date of Patent: Jul. 7, 1992

[54] ADJUSTABLE FOLDING HAY RAKING WINDROWING APPARATUS

[76] Inventor: Gary L. Kelderman, R.R. 1, Oskaloosa, Iowa 52577

[21] Appl. No.: 615,469

[22] Filed: Nov. 19, 1990

[51] Int. Cl.⁵ ............................................. A01D 34/43
[52] U.S. Cl. ..................................... 56/15.9; 56/366; 56/367; 56/377
[58] Field of Search ................... 56/366–367, 56/15.9, 377

[56] References Cited

U.S. PATENT DOCUMENTS

| | | | |
|---|---|---|---|
| 2,925,700 | 2/1960 | Plant | 56/15.9 X |
| 4,047,370 | 9/1977 | Eve | 56/377 |
| 4,183,198 | 1/1980 | Sligter | 56/377 |
| 4,214,428 | 7/1980 | Caraway | 56/377 X |
| 4,723,401 | 2/1988 | Webster et al. | |
| 4,723,402 | 2/1988 | Webster et al. | |
| 4,753,063 | 6/1988 | Buck | 56/377 |
| 4,920,735 | 5/1990 | Bailey et al. | 56/379 X |
| 4,932,197 | 6/1990 | Allen | 56/377 |
| 4,947,631 | 8/1990 | Kuehn | 56/15.5 X |
| 4,974,407 | 12/1990 | Rowe et al. | 56/377 |
| 4,977,734 | 12/1990 | Rowe et al. | 56/15.9 |

FOREIGN PATENT DOCUMENTS 3418352 1/1986 Fed. Rep. of Germany ........ 56/367

OTHER PUBLICATIONS

Copy of 4-page brochure-icam-international company of agricultural machineries and entitled Mounted Side-Delivery Rake.

Copy of 4-page brochure of icam-international company of agricultural machineries and entitled Mounted Side-Delivery Rake Series IR/3-IR/4-IR/5-IRV-/8-IRV/10.

Primary Examiner—Ramon S. Britts
Assistant Examiner—Roger J. Schoeppel
Attorney, Agent, or Firm—Henderson & Sturm

[57] ABSTRACT

A hay raking and windrowing apparatus having a tool bar adapted to be attached to a prime mover and having a side delivery rake attached to one side thereof for raking hay rearwardly and inwardly and a second side delivery rake on the other side of the tool bar for also raking hay rearwardly and inwardly so that both side delivery rakes together produce a single windrow. A folding apparatus is provided on each end of the tool bar for hydraulically folding the rakes between a lowered field operative position and a raised transport position. Hydraulic cylinders are preferably used to move the rakes between the transport and operative positions thereof.

21 Claims, 3 Drawing Sheets

ADJUSTABLE FOLDING HAY RAKING WINDROWING APPARATUS

TECHNICAL FIELD

The present invention relates generally to a side delivery rake apparatus and more particularly to a universal cart for attaching two wheel-type side delivery rakes together to form a pull-type V-rake and mounting them for automatic folding between an operative field position and a transport position.

BACKGROUND ART

Side delivery rakes are commonly used to form long windrows or to combine smaller windrows into larger windrows so that a baler, stacker or the like can pick up the windrow and package it into bales, stacks or the like. One of the most common types of side delivery rakes is commonly referred to as a wheel rake and has a plurality of wheels with evenly spaced teeth extending radially outwardly therearound. Normally a plurality of these toothed wheels are disposed in overlapping relationship with each toothed wheel being disposed forwardly and to one side of the next toothed wheel. These toothed wheels are movable about an axis to move hay rearwardly and to one side as the rake moves forwardly. This wheel-type rake is produced by several companies in Italy and is a common rake imported into the United States. Because farms are small and tractors are small in Italy, these wheel rakes are small in comparison to most side delivery rakes sold in the USA.

One Italian company has developed a frame adapted to be attached to a large tractor's three point hitch and two of these rakes are placed together on a frame to form a V-type rake. This is used to rake hay inwardly and rearwardly on the right side and the left side to produce a single and larger windrow as the V-rake travels through the hay field.

A problem associated with the imported V-rake attached to a single frame and to a tractor's three point hitch is that it must be manually folded between its transport or storage position and its operative field position. Because this is done manually, it is inconvenient. The market for this product is still considerable because it is much cheaper than side delivery rakes of a similar size produced by some of the major U.S. manufacturers.

Another problem with the aforementioned V-rake is that if a tractor passes over a rise in the terrain, such as a terrace, as the front end of the tractor goes down, the rear of the tractor will go up and this will cause the rake, which extends some distance behind the tractor's three point hitch, to lift high in the air and not rake the hay thereunder at such time.

Consequently, there is a need for a wheel-type rake apparatus which takes advantage of the more economical costs of wheel-type rakes and yet overcomes the problem of awkward manual folding and cantilevered mounting off of the back of the three point hitch which may cause certain portions of the field to not be raked efficiently.

DISCLOSURE OF THE INVENTION

The present invention relates generally to a hay raking and windrowing apparatus having a tool bar adapted to be attached to a prime mover and having a side delivery rake attached to one side thereof for raking hay rearwardly and inwardly and a second side delivery rake on the other side of the tool bar for also raking hay rearwardly and inwardly so that both side delivery rakes together produce a single windrow. A folding apparatus is provided on each end of the tool bar for hydraulically folding the rakes between a lowered operative field position and a raised transport position. Hydraulic cylinders are preferably used to move the rakes between the transport and operative positions thereof.

The tool bar is preferable mounted on a trailer having ground engaging wheels so that the rake always remains in contact with the crop when in the operative position thereof, even over ridges or terraces. The rakes on each side of the tool bar can be adjusted inwardly or outwardly in a lateral direction and upwardly or downwardly as needed because of certain adjustable devices attached to the apparatus. This permits the basic cart to be very universal and accept almost any brand of wheel rake without modification of either the rake or the cart.

An object of the present invention is to provide an improved side delivery raking and windrowing apparatus.

A further object of the present invention is to provide a cart which will accept a pair of standard wheel rakes which can be deployed in a V-configuration and easily hydraulically or pneumatically folded between the normal field operative position and a raised transport or storage position.

A still further object of the present invention is to provide a universal mounting apparatus for attaching wheel-type rakes to this aforementioned cart to permit both lateral and vertical adjustments and to accommodate most brands of wheel rakes.

Other objects, advantages, and novel features of the present invention will become apparent from the following detailed description of the invention when considered in conjunction with the accompanying drawings.

BRIEF DESCRIPTION OF THE DRAWINGS

FIG. 1 is a top plan view of a preferred embodiment of the present invention being towed by a tractor through a field and picking up hay which has been cut and partially windrowed by a hay swather or the like;

BEST MODE FOR CARRYING OUT THE INVENTION

Figure 1:
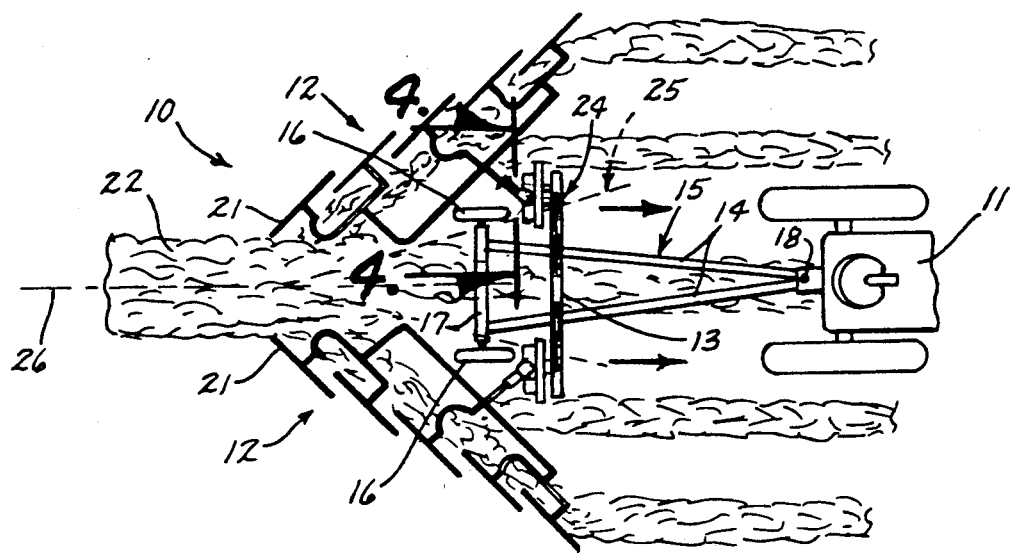

Referring now to the drawings wherein like reference numerals designate identical or corresponding parts throughout the several views, FIG. 1 shows a rake apparatus (10) constructed in accordance with the present invention being towed by a tractor (11).

The apparatus (10) includes a pair of wheel-type side delivery rakes (12) attached to a tool bar (13). The tool bar (13) is welded to frame members (14) of a cart or trailer (15). The cart (15) has ground engaging wheels (16) rotatably attached to a rear member (17) of the cart (15). A pin (18) attaches the front portion of the cart (15) to the rear of the tractor (11) in a conventional fashion.

Each of the side delivery rakes (12) has a plurality of wheels (20) thereon with a plurality of radially extending teeth (21) attached thereto. These wheels with teeth are deployed in the manner shown in FIG. 1 and are supported by the framework shown in FIG. 1 so that as the tractor (11) pulls the apparatus (10) forwardly, to the right as shown in FIG. 1 the spoked wheels (20) will move the hay inwardly and rearwardly so as to ultimately form a large windrow (22) at the extreme rear center of the apparatus (10). the actual configuration of the side delivery rakes (12) will not be dealt with in detail because this is a standard rake in the industry, the construction of which is well known.

Figure 3:
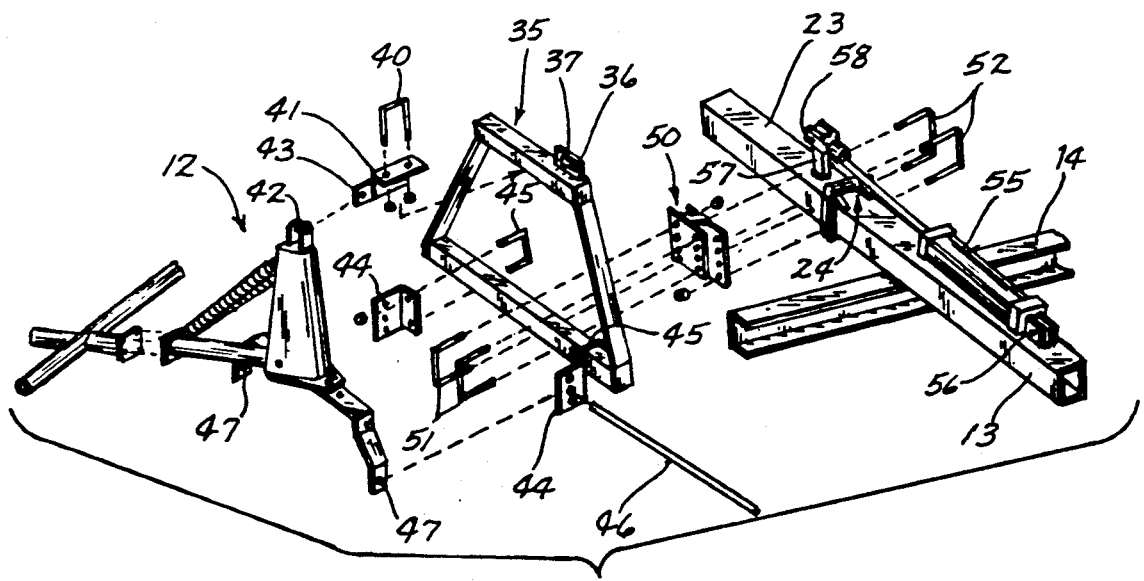
FIG. 3 is a exploded perspective view of the most relevant parts of the left side apparatus which mounts the left side delivery rake to the tool bar, permits it to be adjusted vertically and laterally and permits it to be folded.
Figure 5:
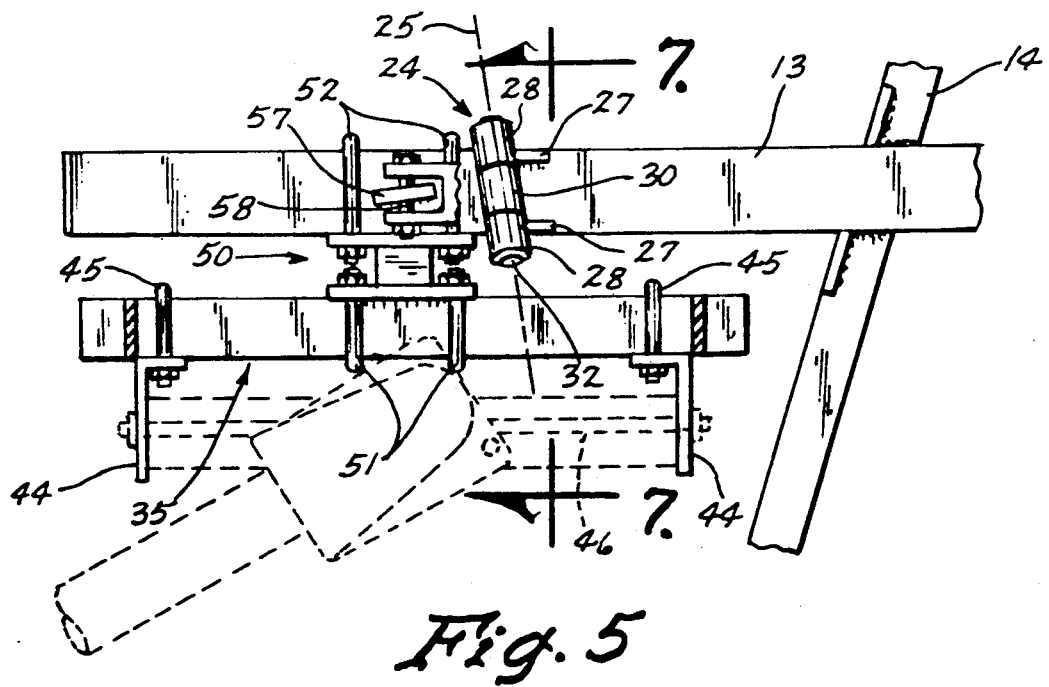
FIG. 5 is a partial cross sectional view taken along line 5—5 of FIG. 4.

Referring to FIGS. 3 and 5, it is noted that the tool bar (13) has an end portion (23) which is pivotally attached thereto by a hinge structure (24) which pivotally attaches the intermediate portion cf the tool bar (13) with member (23) along an axis (25). This axis (25) is neither vertical or horizontal but instead extends upwardly and inwardly toward centerline (26) as the line (25) is followed from the front part of the hinge (24) to the rear part thereof.

Figure 4:
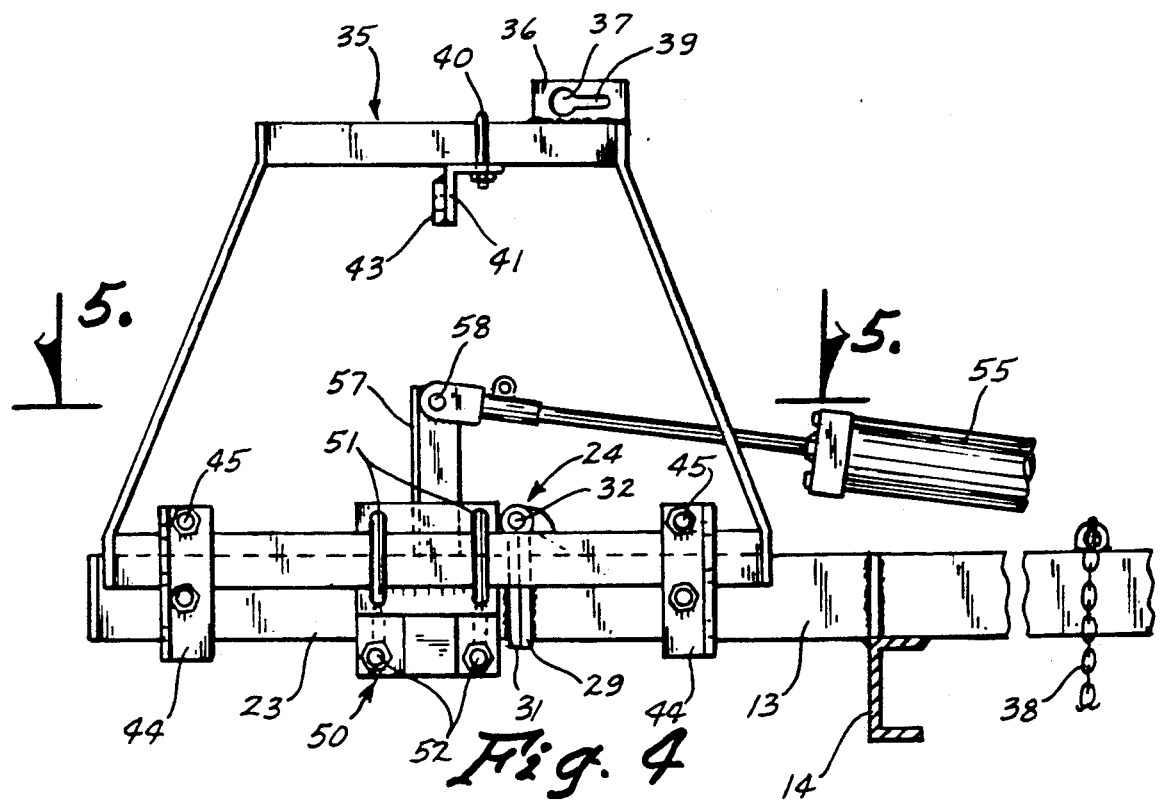
FIG. 4 is an enlarged partial cross sectional view taken along line 4—4 of FIG. 1 and showing the apparatus in a downward hay raking operational position.

Flanges (27) are welded to the tool bar (13) and to portions (28) of the hinge and these portions (28) are also welded to a stop member (29) shown in FIG. 4. Portion (30) of the hinge is welded to member (31) which is, in turn, welded to end member (23). A pin (32) extends through members (28) and (30) to permit the member (23) to pivot with respect to the member (13).

Figure 2:
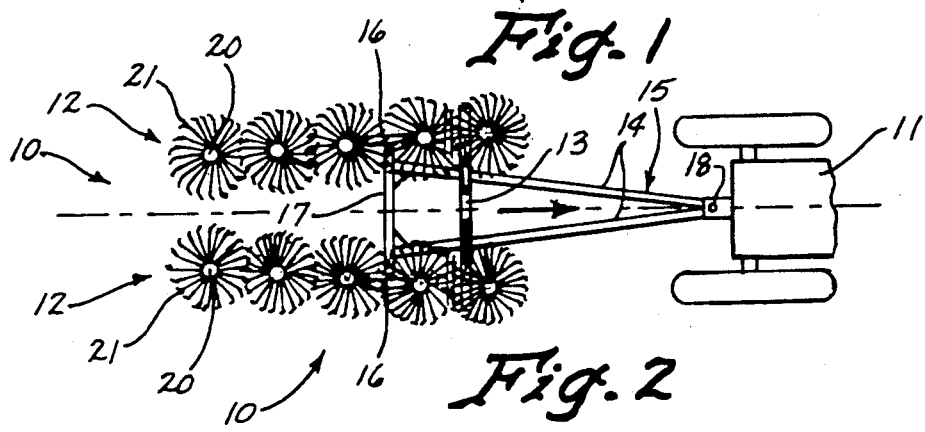
FIG. 2 is a top plan view of the present invention shown in its folded transport position or storage position.

While FIGS. 3-7 show the left side of the folding arrangement of the present invention, it is to be understood that a mirror image of this structure is deployed on the right side of the tool bar (13) as can readily be seen in FIGS. 1 and 2.

Figure 6:
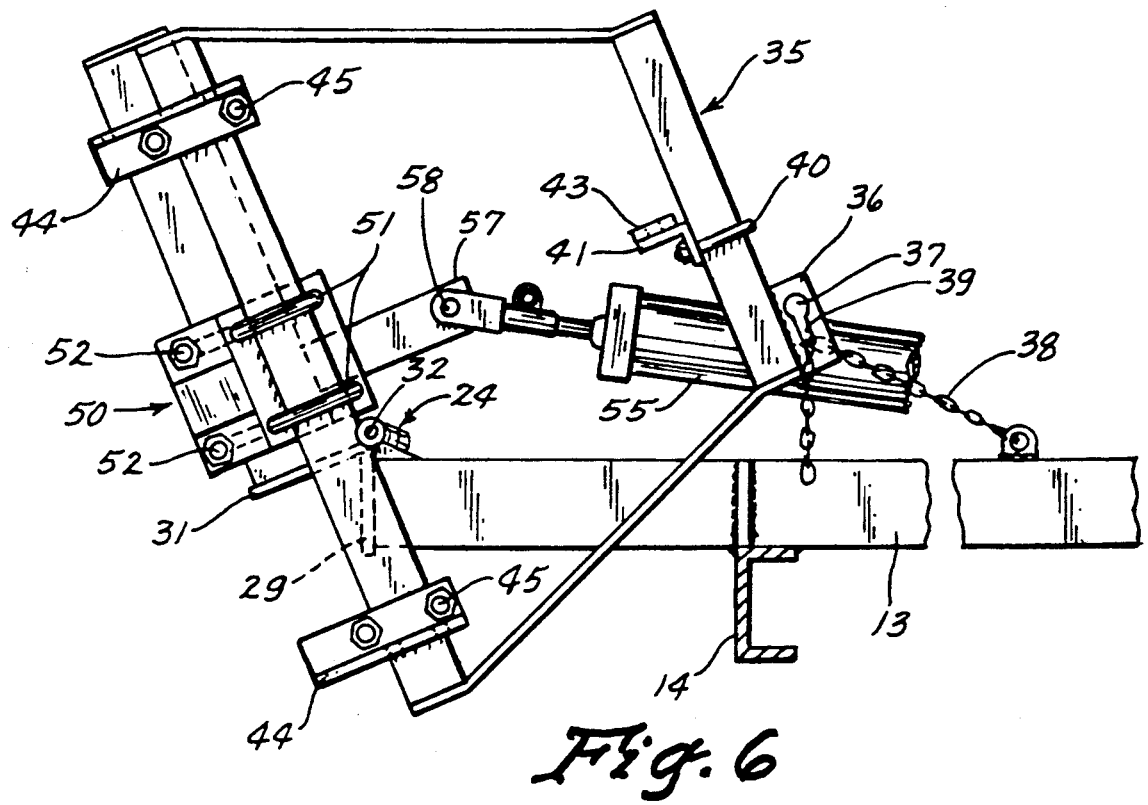
FIG. 6 is a view like FIG. 4 but showing the position of this portion of the invention moved to a raised transport or storage position.

Referring to FIG. 3, it is noted that the rake (12) is adapted to be attached to a three point hitch of a tractor, but instead of attaching it to the three point hitch of a tractor, an A-frame member (35) is provided and this A-frame (35) is preferably constructed by welding the four structural members shown in FIG. 3 together to form a rigid frame. A flange (36) on the top of A-frame (35) has a large opening (37) through which a chain (38) can pass and it also has a slot (39) into which the chain can be locked as is shown in FIG. 6.

A U-bolt (40) is used in combination with a bracket (41) to attach bracket (41) to the top of A-frame (35) to permit clevis (42) to be pinned to flange (43) as is conventional in three point hitch technology. Similarly, flanges (44) are adjustably connected with threaded U-bolts (45) on the bottom part of the A-frame (35) so that a rod (46) can pass through one of the three aligned openings in (44) and through openings (47) in the side delivery rake (12) to form the bottom portion of the three point hitch arrangement. It is to be understood that because of this arrangement, the members (43) and (44) can be adjusted to whatever proper position is needed to accommodate the side delivery rake (12).

Because of the plurality of vertical holes in flanges (44), rakes of different sizes and configurations can easily be accommodated without modification to the device.

Figure 7:
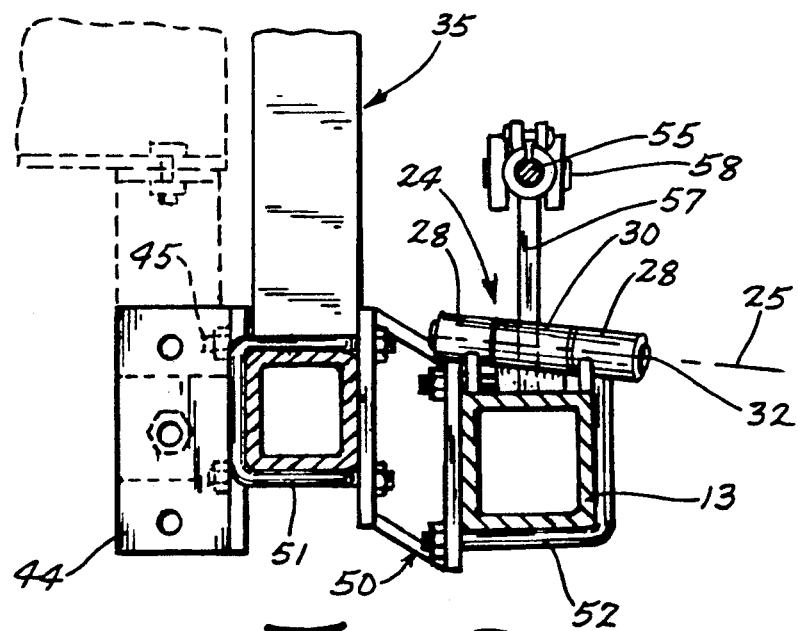
FIG. 7 is an enlarged cross sectional view taken along 7—7 of FIG. 5.

Mounting member (50) is bolted to the lower portion of A-frame (35) by U-bolts (51) and is bolted to folding member (23) by U-bolts (52) and the threaded nuts shown but which are unnumbered. It will be appreciated that because of the number of openings in the connector (50), the A-frame (35) can be adjusted vertically to be at whatever height is desired. Also, the connector (50) can, if desired, be inverted to hold the A-frame member (35) even lower than the position to which it is shown in FIG. 7.

A hydraulic cylinder (55) is shown pivotally mounted at one end by a pin (56) to the intermediate portion of a tool bar (13) and at the other end to a lever (57) rigidly welded to the member (23) and pinned at the top thereof by a pin (58).

Looking at FIG. 4, for example, it is noted that the connecting member (50) is positioned on the inner end of member (23) but is adjustable outwardly by loosening the appropriate nuts on U-bolts (52) and sliding the entire A-frame (35) outwardly, which will of course position the side delivery rake (12) outwardly as well. That way the proper relationship between the right side and left side rakes can be achieved so that the windrow (22) is of the desired width. The U-bolts (52) and nuts are tightened after the desired adjustment has been made.

In operation, each of the side delivery rakes (12) would be positioned in the position shown in FIG. 1 on the A-frames (35) and the A-frame (35) would be positioned laterally and vertically to the desired position. The cart (15) would be attached to the tractor (11) and, when in the field and being used to rake hay into a central windrow (22), the hydraulic cylinder (55) would be extended as shown in FIGS. 1, 3, 4 and 5.

When it is desired to fold the apparatus (10) from the operative field position shown in FIG. 1 to the transport or storage position shown in FIG. 2, hydraulic controls (not shown) on the tractor (11) would be actuated to shorten the length of the hydraulic cylinder (55) from the position shown in FIG. 4 to the position shown in FIGS. 2 and 6. This causes the A-frame (35) and everything connected thereto, including the side delivery rakes (12), to be pivoted about the axis (25) and thereby be moved from the position shown in FIG. 1 to the position shown in FIG. 2. If the rakes (12) are to be held in the storage position shown in FIGS. 2 and 6 for any extended period of time, it is preferable to attach one end of chain (38), which already is secured at the other end to the intermediate portion of the tool bar (13), to flange (36) as shown in FIG. 6 so that the hydraulic pressure can be relieved on the hydraulic cylinders (55).

Accordingly, it will be appreciated that the preferred embodiment disclosed herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A hay raking and windrowing apparatus comprising:

a tool bar adapted to be attached to a prime mover, said tool bar having a first end, a second end, and a longitudinal axis a first side deliver hay rake means for raking hay and moving it into a windrow on the inner rear end thereof;

first rake attachment means for attaching said first rake means to said first end of said tool bar;

first folding means for pivotally mounting said first rake attachment means to said tool bar about a first axis between a downward operative position; wherein a portion of the rake attachment means is aligned along said longitudinal axis and a raised transport position; wherein said portion of the rake attachment means is disposed at an angle to the said longitudinal axis;

first control mean for selectively moving said first rake attachment means and said first rake means between said downward operative position and said raised transport position;

a second side delivery hay rake means for raking hay and moving it into a windrow on the inner rear end thereof;

second rake attachment means for attaching said second rake means to one end of said tool bar;

second folding means for pivotally mounting said second rake attachment means to said tool bar about a second axis between a downward operative position and a raised transport position;

second control means for selectively moving said second rake attachment means and said second rake means between said downward operative position and said raised transport position; and a first invertible vertical adjustment means for selectively adjusting the vertical position of said first rake means with respect to said tool bar.

2. The apparatus of claim 1 wherein further including a first lateral adjustment means for selectively adjusting the lateral position of said first rake means with respect to said tool bar.

3. The apparatus of claim 1 wherein said tool bar is attached to a trailer having ground engaging wheels and said trailer is adapted to be towed by a prime mover.

4. The apparatus of claim 2 further including a second lateral adjustment means for selectively adjusting the lateral position of said second rake means with respect to said tool bar.

5. The apparatus of claim 4 further including a second invertible vertical adjustment means for selectively adjusting the vertical position of said second rake means with respect to said tool bar.

6. The apparatus of claim 1 further including chain means operably attached at one end to said tool bar and selectively operably attached to said first rake attachment means at the other end thereof for selectively holding said first rake attachment means and said first rake means in the raised transport position thereof.

7. The apparatus of claim 1 wherein said first axis extends upwardly and inwardly as it extends rearwardly with respect to a line defining the direction of forward travel of said tool bar.

8. The apparatus of claim 7 further including a second chain means operably attached at one end to said tool bar and selectively operably attached to said second rake attachment means at the other end thereof for selectively holding said second rake attachment means and said second rake means in the raised transport position thereof.

9. The apparatus of claim 8 wherein said second axis extends upwardly and inwardly as it extends rearwardly with respect to the direction of forward travel of said tool bar.

10. The apparatus of claim 1 including ground engaging wheel means operatively rotatably attached to said tool bar.

11. A hay raking and windrowing apparatus comprising:

a tool bar adapted to be attached to a prime mover, said tool bar having an intermediate portion, a first end portion, a second end portion and a longitudinal axis; wherein, in one mode of operation said intermediate portion, first end portion and second end portion are all aligned along the longitudinal axis of said tool bar; and wherein, in another mode of operation the first and second end portions are angularly disposed relative to said intermediate portion;

a first pivoting means for pivotally attaching said first end portion to one end of said intermediate portion along a first axis between a downward operative position and a raised transport position;

second pivoting means for pivotally attaching said second end portion of said tool to the other end of said intermediate portion along a second axis between a downward operative position and a raised transport position;

a first side delivery hay rake means for raking hay and moving it into a windrow on the inner rear end thereof;

first rake attachment means for attaching said first rake means to said first end portion of said tool bar;

first control means for selectively moving said first end portion of said tool bar and said first rake means between said downward operative position and said raised transport position;

a second side delivery hay rake means for raking hay and moving it into a windrow on the inner rear end thereof;

second rake attachment means for attaching said second rake means to said one end portion of said tool bar; and second control means for selectively moving said second end portion of said tool bar and said second rake means between said downward operative position and said raised transport position.

12. The apparatus of claim 11 wherein further including a first lateral adjustment means for selectively adjusting the lateral position of said first rake means with respect to said first end portion of said tool bar.

13. The apparatus of claim 12 further including a first invertible vertical adjustment means for selectively adjusting the vertical position of said first rake means with respect to said first end portion of said tool bar.

14. The apparatus of claim 13 further including a second lateral adjustment mans for selectively adjusting the lateral position of said second rake means with respect to said second end portion of said tool bar.

15. The apparatus of claim 14 further including a second invertible vertical adjustment means for selectively adjusting the vertical position of said second rake means with respect to said second end portion of said tool bar.

16. The apparatus of claim 11 further including chain means operably attached at one end to said intermediate portion of said tool bar and selectively operably attached to said first rake attachment means at the other end thereof for selectively holding said first rake attachment means and said first rake means in the raised transport position thereof.

17. The apparatus of claim 11 wherein said first axis extends upwardly and inwardly as it extends rearwardly with respect to the direction of forward travel of said tool bar.

18. The apparatus of claim 17 further including a second chain means operably attached at one end to said intermediate portion of said tool bar and selectively operably attached to said second rake attachment means at the other end thereof for selectively holding said second rake attachment means and said second rake means in the raised transport position thereof.

19. The apparatus of claim 18 wherein said second axis extends upwardly and inwardly as it extends rearwardly with respect to the direction of forward travel of said tool bar.

20. The apparatus of claim 11 including ground engaging wheel means operatively rotatably attached to said tool bar.

21. The apparatus of claim 11 wherein said tool bar is attached to a trailer having ground engaging wheels and said trailer is adapted to be towed by a prime mover.

* * * * *